United States Patent [19]

Smith

[11] 4,173,457

[45] Nov. 6, 1979

[54] HARDFACING COMPOSITION OF NICKEL-BONDED SINTERED CHROMIUM CARBIDE PARTICLES AND TOOLS HARDFACED THEREOF

[75] Inventor: Thomas J. Smith, LaPorte, Tex.

[73] Assignee: Alloys, Incorporated, Baytown, Tex.

[21] Appl. No.: 889,277

[22] Filed: Mar. 23, 1978

[51] Int. Cl.$^2$ .......................... C04B 31/16; B24D 3/08
[52] U.S. Cl. ........................................ 51/309; 51/307; 175/409
[58] Field of Search .......................... 51/295, 309, 307; 175/409, 410, 411

[56] References Cited

U.S. PATENT DOCUMENTS

| | | | |
|---|---|---|---|
| 2,712,988 | 7/1955 | Kurtz | 51/309 |
| 3,128,165 | 4/1964 | Bridwell et al. | 51/309 |
| 3,751,283 | 8/1973 | Dawson | 51/309 |
| 3,774,355 | 11/1973 | Dawson et al. | 51/309 |
| 3,868,235 | 2/1975 | Held | 51/309 |
| 3,918,217 | 11/1975 | Oliver | 51/309 |

*Primary Examiner*—Donald J. Arnold

[57] ABSTRACT

A mining or drilling tool which has a region subject to excessive wear is hardfaced on such region with sintered chromium carbide particles metallurgically bonded on the tool by a steel matrix which is alloyed with the particles at the interfaces therebetween. The particles are in a size range of 10 to 60 mesh and are present in an amount for effective abrasion resistance. The particles are comprised of grains of chromium carbide having an average size in the range of 0.5 to 25 microns disposed in a binder comprising a major portion of nickel. Minor portions of grain growth inhibitors, particularly, tinanium carbide and molybdenum carbide, are preferably components of the carbide particles so as to inhibit growth of the chromium carbide grains to be such that such grains have an average size in the range of 0.5 to 15 microns. The particles are preferably coated, prior to being applied as the hardfacing, with one or more materials such as ferrosilicon, ferromanganese, ferromolybdenum, nichrome and others identified below, to limit the alloying of the particle per se with a steel matrix, to improve the matrix, and to improve the welding characteristics of the hardfacing materials. There is also provided material comprising discrete particles as above described which are useful in forming the hardfacing material on the tool.

34 Claims, No Drawings

HARDFACING COMPOSITION OF NICKEL-BONDED SINTERED CHROMIUM CARBIDE PARTICLES AND TOOLS HARDFACED THEREOF

This invention relates to metallurgical compositions useful as hardfacing materials and to tools having such materials disposed thereon.

Hardfacing compositions consisting of sintered tungsten carbide-cobalt granules dispersed in a metal matrix have long been used to increase the wear resistance of earth drilling equipment. There are several disadvantages in using this type of hardfacing, a number of which will be mentioned, although not necessarily in their order of importance. First, the particles are about twice the specific gravity of the metal matrix and when being applied, tend to sink to the bottom of the matrix making the outer surface of the tool being hardfaced subject to relatively rapid wear.

Another disadvantage of such sintered tungsten carbide hardfacing is its cost.

Still another disadvantage is the problem of bonding the tungsten carbide particles to the steel matrix. This is especially true of the typical sintered tungsten carbide particles which contain cobalt as the binder. During the process of laying down these particles in a steel matrix, it has been found that a brittle intermetallic phase frequently forms at the interface between the particles and the matrix. This phase is very brittle and, therefore, provides a very weak bond between the carbide particles and the steel matrix so that, in use, the particles may prematurely become dislodged from the matrix.

In accordance with this invention, sintered or cemented chromium carbide particles, described more fully below, are used to replace cemented tungsten carbide particles as a hardfacing material. Thus, the sintered chromium carbide particles, having a composition and to the size range discussed below, are metallurgically bonded on the tool to be hardfaced by a steel matrix which is alloyed with the particles at the interfaces therebetween. This type of hardfacing wherein macroscopic chromium carbide particles are dispersed in a steel matrix is to be sharply distinguished from the known art of coating objects, such as turbine blades, with a relatively homogeneous layer of very fine chromium carbide particles, usually intermixed with equally fine particles of nickel or a nickel-chromium alloy. In such a coating process, a mechanical mixture of chromium carbide and nickel-chromium in a very finely powdered form is applied by plasma spray, flame spray or detonation gun processes. Examples of such coatings are disclosed in the Pelton et al U.S. Pat. No. 3,150,938, issued Sept. 29, 1964, and the Walfla et al U.S. Pat. No. 3,971,633, issued July 27, 1976. It should be noted that the coatings thus described do not contain sintered chromium carbide particles having characteristics which make them useful in hardfacing applications.

Thus, in accordance with this invention, sintered chromium carbide particles are provided in which the particle size is within the range of 10 to 60 mesh and preferably 14 to 30 mesh. When a mesh size is specified herein, it is with reference to the U.S. Standard Screen size.

Each of the particles is made up of grains of chromium carbide having an average grain size within the range of 0.5 to 25 microns, and preferably in the range of 0.5 to 15 microns. These grains of chromium carbide are cemented with a binder of which a major portion is nickel. The broad range of composition of the carbide particles can be from 3 to 25 percent binder, the balance being chromium carbide. Particles having compositions in this range have been tested and found to have a hardness of 87.8 to 88.8 Rockwell A and a density of from 6.8 to 7.0 grams per cubic centimeter. A typical composition in this range is 10 percent nickel with the balance being chromium carbide. This composition was found to have a Rockwell A hardness of 88.1 and a density of 6.9 grams per cubic centimeter.

A somewhat more preferred composition for the particles is from 3 to 25 percent nichrome, with the balance being chromium carbide. Compositions in this range have been found to have a hardness from 88.0 to 89.0 Rockwell A and a density of 6.8 to 7.0 grams per cubic centimeter. A typical composition within this range is 12 percent nichrome and the balance chromium carbide, which has been found to have a hardness of 88.6 Rockwell A and a density of 6.9 grams per cc. The term "nichrome" as used herein denotes an alloy of 75 to 95 percent nickel, with the balance being chromium.

When the chromium carbide particles have only chromium carbide and binder present during sintering, the chromium carbide undergoes grain growth when using normal sintering techniques. For example, when chromium carbide powders having an average particle size of 0.5 to 5.0 microns are used, the grains will normally grow in size to an average within the range of 5 to 25 microns. It has been found that when certain grain growth inhibitors are added in minor amounts, the average grain size can be maintained in the range of 0.5 to 15 microns. This results in improved hardness. Thus, one or more of, for instance, titanium carbide, molybdenum carbide, vanadium carbide or tantalum carbide can be added in minor amounts effective to retard grain growth of the chromium carbide. A preferred range for titanium carbide is from 2 to 12 percent based on the total weight of the particles. The preferred range for molybdenum carbide is from 0.2 to 5 percent. Therefore, a preferred composition will contain from 3 to 16 percent of nichrome binder, 2 to 12 percent of titanium carbide, 0.2 to 5 percent molybdenum carbide, with the balance being chromium carbide. It has been found that particles of this composition have a hardness within the range of 90.6 to 91.6 Rockwell A and a density of 6.8 to 7.0 grams per cc. A typical composition in this range is 1.2 percent molybdenum carbide, 4.6 percent titanium carbide, 6.5 percent nichrome, with the balance being chromium carbide. This typical composition was found to have a Rockwell A hardness of 91.4 and a density of 6.9 grams per cc.

The manufacturing techniques employed to make the chromium carbide particles of this invention can be anyone of those which have heretofore been used to manufacture tungsten carbide particles for hardfacing material. Thus, the process can consist essentially of milling the various carbide or carbides and the binder in a hydrocarbon, such as heptane, to achieve an average particle size of from 0.5 to 10 microns, preferably 1.5 to 2.5 microns. The resulting powder can have wax added to it, following which it can be tumbled, dewaxed and sintered to achieve roughly spherical particles or granules in the size range of 10 to 60 mesh, preferably 14 to 30 mesh. Of course, other techniques known to those skilled in the art can be employed to achieve substantially the same results.

The particles can be applied to the portion of the tool to be hardfaced by using known welding techniques employed in forming conventional hardfacings. A preferred technique involves placing the particles in a tube of ordinary or alloy steel as may be desired and then using a welding torch to melt the tube and deposit the particles in the resulting steel matrix. Part of the matrix comes from the melted surface of the tool being hardfaced, and part comes from the tube. Another technique used for hardfacing tools is one whereby a wire or rod is welded onto the tool and the hardfacing materials are deposited in the molten steel puddle resulting therefrom. Still another technique is one whereby the hardfacing materials are glued to the tool with sodium silicate, as an example, and the materials are then "sweated" into the surface of the tool by various well-known means. It has been found that the resulting hardfacing has the chromium carbide particles metallurgically bonded on the tool by the steel matrix, which alloys with the particles at their outer surfaces. Also, the interfaces between the matrix and the particles are free from any brittle intermetallic compound such as is frequently found at the interface between cemented tungsten carbide particles and the steel matrix. This superior bond strength is due in part to alloying between the cemented chromium carbide particles and the steel matrix, and in part to the resistance of the particles to high temperature oxidation during the welding operation. The alloying also enhances the properties of the steel matrix.

Since the particles have a density approximating that of the steel to be hardfaced, there is a more optimum distribution of particles throughout the steel matrix contrasted to cemented tungsten carbide-cobalt particles which tend to sink to the bottom of the steel matrix, making the outer surface of the deposit subject to rapid wear. Due to this distribution and the excellent bonding with the chromium carbide particles, there is no necessity for "densification" or enhancement of particle bonding by any technique such as heat treating, or extended heating by torch or other means to improve wetting of the particles by the steel matrix. Also, it is not necessary to grind the wear resistant surfaces to reach a dense layer of particles.

The hardfacing of this invention is substantially more economical than that of the prior tungsten carbide type of hardfacings. For example, the initial raw material cost is substantially less in that chromium carbide is considerably cheaper than tungsten carbide. Further, since the specific gravity of the chromium carbide particles is roughly one-half of the tungsten carbide particles, less weight of the sintered chromium carbide particles for hardfacing the same area is required. Moreover, by avoiding "densification" and other treatments of the hardfacing material after it is initially deposited, still further economies can be realized.

The improvement in the steel matrix due to the alloying of it with the carbide granules can be further enhanced by coating the particles with fine powders using a suitable bonding agent. These powders are used in minor amounts, with the exact amount being dependent upon the degree of additional alloying of the matrix which is desired. In addition to the powders improving the metallurgical aspects of the matrix, they also tend to limit the degree of alloying of the matrix with the particle per se, and in this sense they should be present in an amount sufficient to prevent excessive alloying of the particle with the matrix but insufficient to totally prevent such alloying. They also enhance the bonding of the particles with the matrix, improve the welding characteristics of the hardfacing materials, and facilitate the formation of sound weld deposits free from voids and pin holes and further, assure a uniform distribution of the particles in the matrix. Among the coatings which can be used and the preferred ranges thereof, based on a total weight of the particles, are the following:

Ferrosilicon (50/50) 0.5–15%
Ferromanganese (35/65) 0.2–5%
Ferromolybdenum (40/60) 0.2–5%
Siliconmanganese (40/60) 0.2–5%
Ferroboron (80/20) 1.0–10%
Carbon 0.01–2%
Chromium carbide 0.5–10%
Nichrome (80/20) 0.5–15%
Ferrochrome 0.2–5%

As used herein, the term chromium carbide means essentially $Cr_3C_2$; the term titanium carbide means TiC; the term molybdenum carbide means $Mo_2C$ or MoC; the term vanadium carbide means VC; and the term tantalum carbide means TaC. Also, all percentages are expressed as weight percentages.

From the foregoing, it will be seen that this invention is one well adapted to attain all of the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the process of this invention without departing from the scope thereof, it is to be understood that all matter herein set forth is to be interpreted as illustrative and not in a limiting sense.

The invention having been described, what is claimed is:

1. A tool for use in the penetration of earthen formations wherein the tool has at least one region of steel subject to excessive wear, said tool having an improved hardfacing on such region of sintered chromium carbide particles metallurgically bonded to the tool by a matrix consisting essentially of the underlying steel of said tool alloyed with the particles at the interfaces therebetween, with the interfaces being free from any brittle intermetallic compound such as would interfere with the alloy bond between the particles and matrix, said particles being in the size range of 10 to 60 mesh and being present in an amount for effective abrasion resistance, the particles comprising metal carbide grains of chromium carbide of an average grain size in the range of 0.5 to 25 microns disposed in a binder comprising a major portion of nickel.

2. The tool of claim 1 wherein the binder comprises 5 to 25 percent chromium alloyed with said nickel.

3. The tool of claim 2 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

4. The tool of claim 2 wherein the particles also contain from 2 to 12 percent titanium carbide based on the total weight of the particles.

5. The tool of claim 4 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

6. The tool of claim 2 wherein the particles also contain from 0.2 to 5 percent of molybdenum carbide based on the total weight of the particles.

7. The tool of claim 6 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

8. The tool of claim 6 wherein the particles also contain from 2 to 12 percent of titanium carbide based an the weight of the particles.

9. The tool of claim 8 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

10. The tool of claim 1 wherein the particles also contain from 2 to 12 percent titanium carbide based on the total weight of the particles.

11. The tool of claim 10 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

12. The tool of claim 10 wherein the particles further contain from 0.2 to 5 percent of molybdenum carbide based on the total weight of the particles.

13. The tool of claim 12 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

14. The tool of claim 1 wherein the particles also contain from 0.2 to 5 percent of molybdenum carbide based on the total weight of the particles.

15. The tool of claim 14 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

16. The tool of claim 1 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

17. A tool for use in the penetration of earthen formations wherein the tool has a region of steel subject to excessive wear, said tool having an improved hardfacing on such region of sintered chromium carbide particles metallurgically bonded to the tool by a matrix consisting essentially of the underlying steel of said tool alloyed with the particles at the interfaces therebetween with the interfaces being free from any brittle intermetallic compound such as would interfere with the alloy bond between the particles and matrix, said particles being in the size range of 14 to 30 mesh and being present in an amount for effective abrasion resistance, the particles comprising chromium carbide grains in an amount of 70 to 95 percent, titanium carbide grains in an amount of 2 to 12 percent, and molybdenum carbide grains in an amount of 0.2 to 5 percent, all of said grain being of an average size of from 0.5 to 15 microns, said grains being disposed in from 3 to 16 percent of nichrome binder containing 75 to 95 percent nickel and 25 to 5 percent chromium.

18. The tool of claim 17 wherein the particles are coated with a minor amount of one or more of powdered ferrosilicon, ferromanganese, ferromolybdenum, sliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

19. A material for hardfacing earth drilling and mining tools using welding techniques comprising a plurality of discrete sintered chromium carbide particles having a size within the range of 10 to 60 mesh, the particles comprising grains of chromium carbide having an average grain size in the range of 0.5 to 25 microns disposed in a binder comprising a major portion of nickel.

20. The material of claim 19 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

21. The material of claim 19 wherein the particles further contain from 2 to 12 percent of titanium carbide based on the total weight of the particles.

22. The material of claim 21 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

23. The material of claim 19 wherein the particles further contain from 0.2 to 5 percent molybdenum carbide based on the total weight of the particles.

24. The material of claim 23 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

25. The material of claim 19 wherein the particles further contain from 2 to 12 percent of titanium carbide and from 0.2 to 5 percent molybdenum carbide, based on the total weight of the particles.

26. The material of claim 25 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

27. The material of claim 19 wherein the binder comprises 5 to 25 percent chromium alloyed with said nickel.

28. The material of claim 27 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

29. The material of claim 27 wherein the particles also contain from 2 to 12 percent titanium carbide based on the total weight of the particles.

30. The material of claim 29 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

31. The material of claim 27 wherein the particles also contain from 0.2 to 5 percent of molybdenum carbide based on the total weight of the particles.

32. The material of claim 31 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particle per se with the underlying steel of the tool but insufficient to totally prevent such alloying.

33. The material of claim 31 wherein the particles also contain from 2 to 12 percent of titanium carbide based on the weight of the particles.

34. The material of claim 33 wherein the particles are coated with a minor amount of one or more of powdered ferrosilicon, ferromanganese, ferromolybdenum, siliconmanganese, ferroboron, carbon, chromium carbide, nickelchrome and ferrochrome prior to being bonded to the tool, the coating being present in an amount sufficient to prevent excessive alloying of the particles per se with the underlying steel of the tool but insufficient to totally prevent such alloying.

* * * * *